(12) United States Patent
Horie et al.

(10) Patent No.: US 8,873,697 B2
(45) Date of Patent: Oct. 28, 2014

(54) LIQUID METAL COOLED NUCLEAR REACTOR AND HEAT REMOVAL METHOD FOR THE SAME

(75) Inventors: Hideki Horie, Kanagawa-ken (JP); Yasushi Tsuboi, Kanagawa-ken (JP); Fumie Sebe, Kanagawa-ken (JP); Nobuhisa Takezawa, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 154 days.

(21) Appl. No.: 13/600,488

(22) Filed: Aug. 31, 2012

(65) Prior Publication Data
US 2013/0114778 A1 May 9, 2013

Related U.S. Application Data

(63) Continuation of application No. PCT/JP2011/059393, filed on Apr. 15, 2011.

(30) Foreign Application Priority Data

Apr. 21, 2010 (JP) ................................. 2010-097825

(51) Int. Cl.
| | |
|---|---|
| G21C 15/18 | (2006.01) |
| G21C 13/02 | (2006.01) |
| G21C 15/12 | (2006.01) |
| G21C 1/03 | (2006.01) |

(52) U.S. Cl.
CPC ................ *G21C 15/18* (2013.01); *G21C 13/02* (2013.01); *Y02E 30/34* (2013.01); *G21C 15/12* (2013.01); *G21C 1/03* (2013.01); *Y02E 30/35* (2013.01)
USPC .......................................... 376/282; 376/299

(58) Field of Classification Search
USPC .......................................... 376/282, 298, 299
See application file for complete search history.

(56) References Cited

U.S. PATENT DOCUMENTS

| | | | | |
|---|---|---|---|---|
| 4,767,593 A | * | 8/1988 | Wedellsborg | 376/294 |
| 5,499,277 A | * | 3/1996 | Hunsbedt | 376/299 |
| 2008/0198960 A1 | * | 8/2008 | Keegan et al. | 376/289 |
| 2008/0219395 A1 | * | 9/2008 | Pop et al. | 376/282 |

FOREIGN PATENT DOCUMENTS

| | | | |
|---|---|---|---|
| GB | 2 263 188 A | | 7/1993 |
| GB | 2263188 A | * | 7/1993 |
| JP | 05-264773 | | 10/1993 |
| JP | 5-264773 A | | 10/1993 |

(Continued)

OTHER PUBLICATIONS

Office Action issued Jul. 5, 2013 in Russian Patent Application No. 2012137776/07 with Partial English language translation.

(Continued)

*Primary Examiner* — Jack Keith
*Assistant Examiner* — Timothy A Brainard
(74) *Attorney, Agent, or Firm* — Oblon, Spivak, McClelland, Maier & Neustadt, L.L.P.

(57) ABSTRACT

A liquid metal cooled nuclear reactor includes a reactor vessel, a containment, an air flow path, and an injection unit. The vessel has a reactor core and a coolant for the reactor core. The containment surrounds an outside of the vessel. The air flow path removes heat by flowing air around the containment. The injection unit injects filler in a gap between the vessel and the containment.

9 Claims, 16 Drawing Sheets

(56) References Cited

FOREIGN PATENT DOCUMENTS

| | | | |
|---|---:|---|---|
| JP | 2813412 | B2 | 8/1998 |
| JP | 3499920 | B2 | 12/2003 |
| KR | 10-2009-0066663 | A | 6/2009 |

OTHER PUBLICATIONS

Office Action issued on Dec. 24, 2013 in the corresponding Japanese Patent Application No. 2010-097825 (with English Translation).

* cited by examiner

LIQUID METAL COOLED NUCLEAR REACTOR AND HEAT REMOVAL METHOD FOR THE SAME

CROSS REFERENCE TO RELATED APPLICATION

This is a Continuation Application of International Application No. PCT/JP2011/059393 filed on Apr. 15, 2011, which is based upon and claims the benefit of priority from the prior Japanese Patent Application No. 2010-097825 filed on Apr. 21, 2010, the entire contents of which are incorporated herein by reference.

FIELD

Embodiments relates basically to a liquid metal cooled nuclear reactor and a heat removal method for the same.

BACKGROUND

A liquid metal cooled nuclear reactor needs to shut down a fission reaction of the fuel and reach low temperatures in order to handle emergency or maintenance. The reactor is commonly shut down by inserting a safety rod into the reactor core and removing neutrons from its fuel. Unfortunately, also after the reactor is shut down, residual decay heat from the reactor core lasts for a certain time. Accordingly, the temperature of a liquid metal coolant inside a reactor vessel does not lower immediately. Thus, the residual decay heat should be removed for maintenance work after the shutdown of the reactor.

The liquid metal coolant and the reactor construction have large heat capacity to assist the dissipation of the residual decay heat. The decay heat accumulated in the liquid metal coolant is transferred from the reactor vessel to the containment, and then carried away by a Reactor Vessel Auxiliary Cooling System (RVACS).

This prevents the reactor vessel and the containment made commonly of SUS from their strength degradation due to the exposure to high temperatures over a long period of time. A concrete silo arranged outside the reactor vessel and the containment is also prevented from its characteristic change and going brittle.

It has been disclosed that perforated flow channels are provided to the wall of a flow guide plate in a liquid metal cooled nuclear reactor in order to enhance the removal of such residual decay heat. An art is also disclosed, which relates to enhancement of the heat removal for a containment of a nuclear reactor by wetting the outer surface of the containment with water, although the art has not been applied to a liquid metal cooled nuclear reactor.

Meanwhile, heat generated during normal operation of a nuclear reactor and residual decay heat of the nuclear reactor are conducted to a Reactor Vessel Auxiliary Cooling System (RVACS) by radiation across the gap between the reactor vessel and the contentment of the nuclear reactor; and by heat conduction and convection of the inactive gas sealed in the gap.

Furthermore, the heat conduction and the convection have less contribution whereas the radiation has dominant contribution to the heat transfer across the gap between the reactor vessel and the containment. For that reason, the outer wall of the reactor vessel and the inner wall of the containment are surface-treated to have a high radiation factor, such that the heat-transfer efficiency increases owing to the radiation.

In fact, there exists a large temperature difference between the reactor vessel and the containment, showing a low heat-transfer efficiency therebetween in the heat removal with the reactor vessel auxiliary cooling system (RVACS).

BRIEF DESCRIPTION OF THE DRAWINGS

Aspects of this disclosure will become apparent upon reading the following detailed description and upon reference to the accompanying drawings.

DESCRIPTION

As will be described below, in accordance with an embodiment, a liquid metal cooled nuclear reactor includes a reactor vessel, a containment, an air flow path, and an injection unit. The reactor vessel has a reactor core and a coolant for the core. The containment surrounds an outside of the vessel. The air flow path is configured to flow air around the containment to remove heat of the containment. The injection unit is configured to inject a filler in a gap between the vessel and the containment.

In accordance with another embodiment, a heat removal method for the liquid metal cooled nuclear reactor includes:

injecting a filler into a gap between a reactor vessel holding a reactor core and a containment surrounding an outside of the reactor vessel; and flowing air around the containment to remove heat of the containment.

First Embodiment

Figure 1:
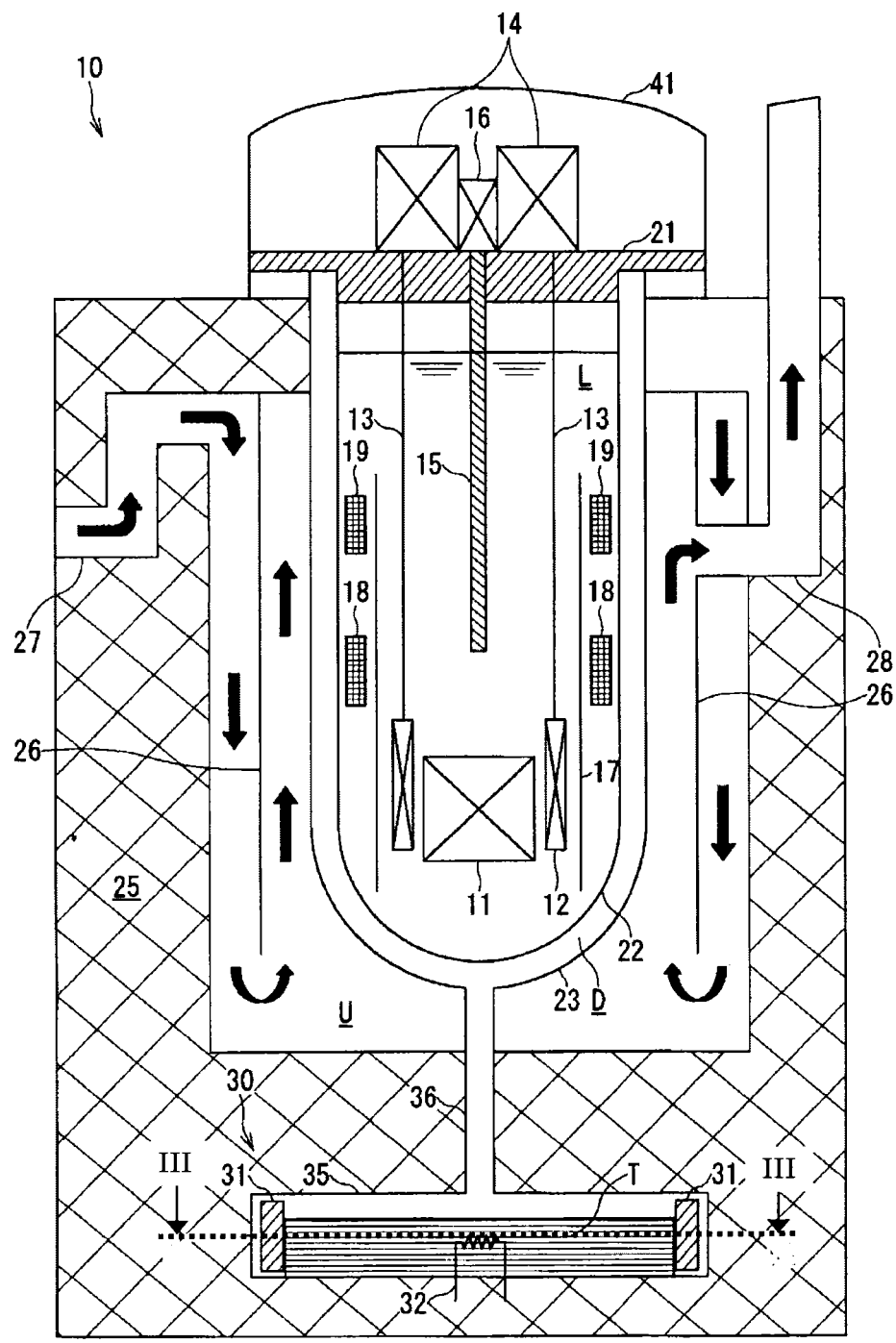
FIG. 1 is a structural section showing a first embodiment of a liquid metal cooled nuclear reactor in accordance with a first embodiment.

Embodiments will be described with reference to the drawings below. FIG. 1 is a structural unit showing a liquid metal cooled nuclear reactor in accordance with a first embodiment. As shown in the unit, the liquid metal cooled nuclear reactor 10 of the first embodiment is provided with a reactor core 11, a reactor vessel 22 to hold a coolant L, a containment 23 to surround the outside of the reactor vessel 22, an injection unit 30 to inject a filler T into the gap D between the reactor vessel 22 and the containment 23, and an air flow path U to remove heat by flowing air around the containment 23. The reactor vessel 22, the containment 23, the injection unit 30, and the air flow path U are formed inside a concrete silo 25 that has been buried in the ground.

The upper openings of both the reactor vessel 22 and the containment 23 are supported by the lower side of a support plate 21. The containment 23 surrounds the reactor core 11 with the reactor vessel 22 to maintain the position of a coolant L if the reactor vessel 22 inside the containment is damaged so that the coolant L leaks, which prevents the reactor core 11 from boil-dry events. Drive units 14, 16 for driving neutron reflectors 12 and a safety rod 15 are arranged on the upper side of the support plate 21; and the top side of the drive units 14, 16 is further covered with a top dome 41.

The neutron reflectors 12, which are suspended by a wire 13 and arranged in a circular pattern, are moved vertically along the outer circumference of the reactor core 11 by the drive unit 14. The neutron reflectors 12 regulate neutrons emitted from the reactor core 11 to control the nuclear fission reaction. If the neutron reflectors 12 are lifted from the bottom side of the reactor core 11 toward the top side, fast neutrons emitted from the reactor core 11 are slowed down by the neutron reflectors 12 to become thermal neutrons that are returned to the reactor core 11. Then the reactor core 11 absorbs the thermal neutrons to maintain the chain reaction of nuclear fission, which outputs thermal energy continuously. The safety rod 15, which is vertically moved by the drive unit 16, is inserted into the reactor core 11 to absorb thermal neutrons so that the safety rod 15 retards the chain reaction of nuclear fission to stop the reactor 10.

The coolant L is made from liquid metal such as liquid sodium. The reactor vessel 22 is filled with the liquid metal. An inactive gas is sealed in a space between the position of the liquid metal and the support plate 21. The coolant L is circulated by an electromagnetic pump 18 inside the reactor vessel 22 from the outside of a cylindrical partition wall 17 to the inside thereof to collect thermal energy from the reactor core 11 that produces heat. The coolant L is cooled down by heat exchange with a secondary coolant flowing through a secondary-coolant flow pipe (not shown) at an intermediate heat exchanger 19. The coolant L repeats circulations such that the coolant L is cooled down, pressurized again by the electromagnetic pump 18, falls along the outside of the partition wall 17, returns at the bottom of the partition wall 17, ascends thereinside, and receives heat supply in the reactor core 11.

A reactor vessel auxiliary cooling system (RVACS: Reactor Vessel Auxiliary Cooling System) to be formed outside the containment 23 will be described. This RVACS removes heat by natural convection of air, where the air circulates through the air flow path U that includes the outer surface of the containment 23, the inner surface of the silo 25, and a cylindrical flow guide plate 26.

Air to circulate through the air flow path U is taken in from an inlet 27, falls along the outer surface of the flow guide plate 26, returns at the bottom thereof, climbs along the inner surface of the flow guide plate 26, removes heat from the outer surface of the containment 23, and is then drained from an outlet 28 to the atmosphere.

The injection unit 30 includes a pressurization unit 31, a heater unit 32, a liquid reservoir unit 35, and a connection path 36. After the reactor core 11 has been shut down, the injection unit 30 injects the filler T into the gap D between the reactor vessel 22 and the containment 23; and enhances the thermal conduction between the reactor vessel 22 and the containment 23, thereby enhancing the heat removal efficiency of decay heat in the RVACS.

The liquid reservoir unit 35 is configured to have capacity higher than the capacity of the gap D to reserve the filler T at a position lower than the bottom of the coolant L. The filler T is in a liquid state or a gas state at the achieving temperatures of the reactor vessel 22 and the containment 23. High thermal conductivity materials, e.g., low-melting-point metals can be employed for the filler T. The metals include solder (alloy of lead and tin), wood's metal (alloy of bismuth, lead, tin, and cadmium), and indium.

Figure 2:
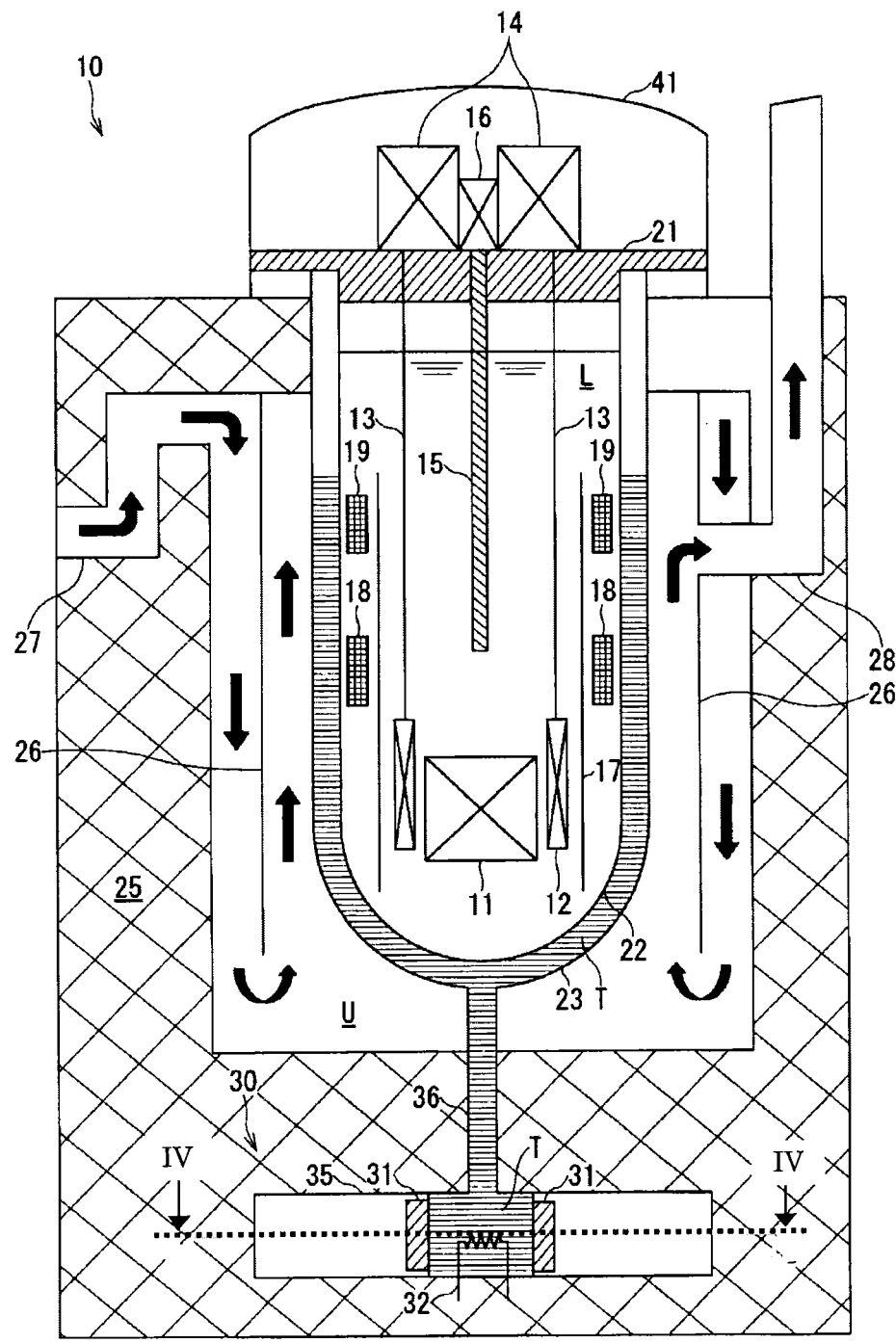
FIG. 2 is a view to explain operation of the liquid metal cooled nuclear reactor in accordance with the first embodiment.

In addition, if the metals are employed for the filler T, the filler T is heated with the heater unit 32 in the liquid reservoir unit 35 to maintain a melt state. The pressurization unit 31 includes a piston that horizontally moves from the ends of the liquid reservoir unit 35 toward the opening direction of the connection path 36 in the liquid reservoir unit 35. FIG. 2 is a view to explain operation of the liquid metal cooled nuclear reactor in accordance with the first embodiment. As shown in the view, the pressurization unit 31 pressurizes the filler T, which leads the filler T in the liquid reservoir unit 35 to the gap D via the connection path 36.

Figure 3:
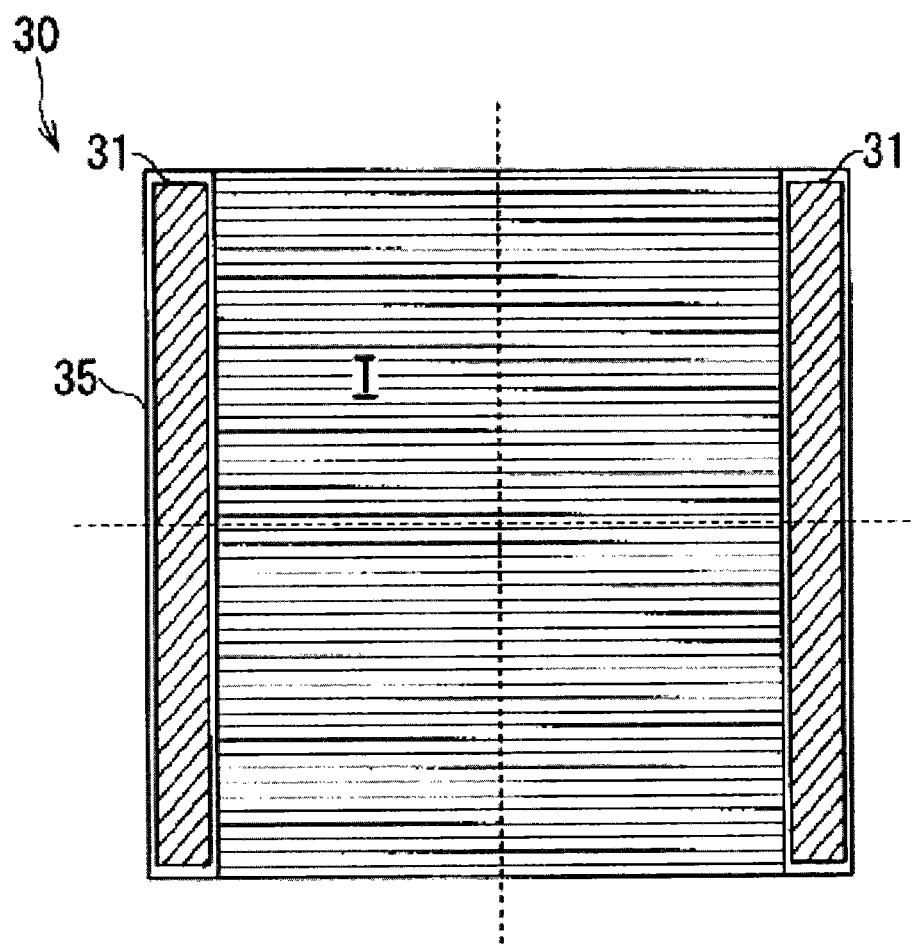
FIG. 3 is a sectional view cut along a III-III line in FIG. 1.
Figure 4:
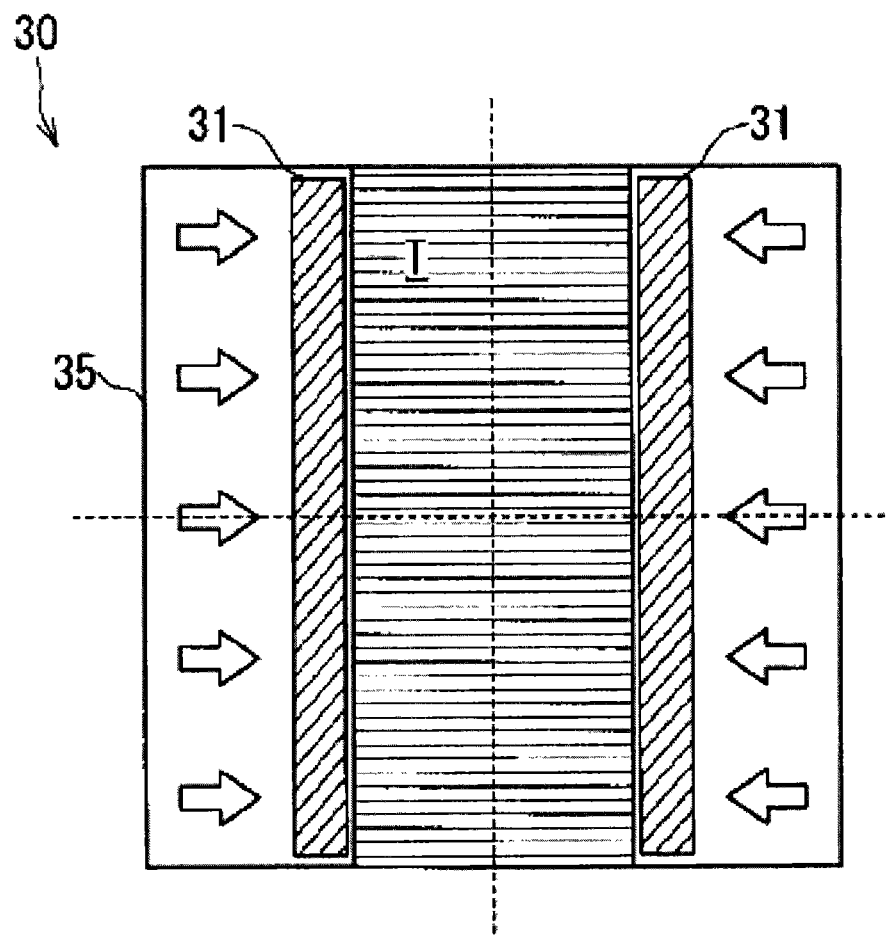
FIG. 4 is a sectional view cut along a IV-IV line in FIG. 2.

In addition, FIGS. 3 and 4 show a cross section taken along III-III in FIG. 1 and a cross section taken along IV-IV in FIG. 2, both showing the action of the liquid reservoir unit 35, respectively. When the removal of decay heat has been finished, the reverse action returns the piston of the pressurization unit 31 to its original outside position, which returns the filler T injected into the gap D to the inside of the liquid reservoir unit 35.

Figure 5A:
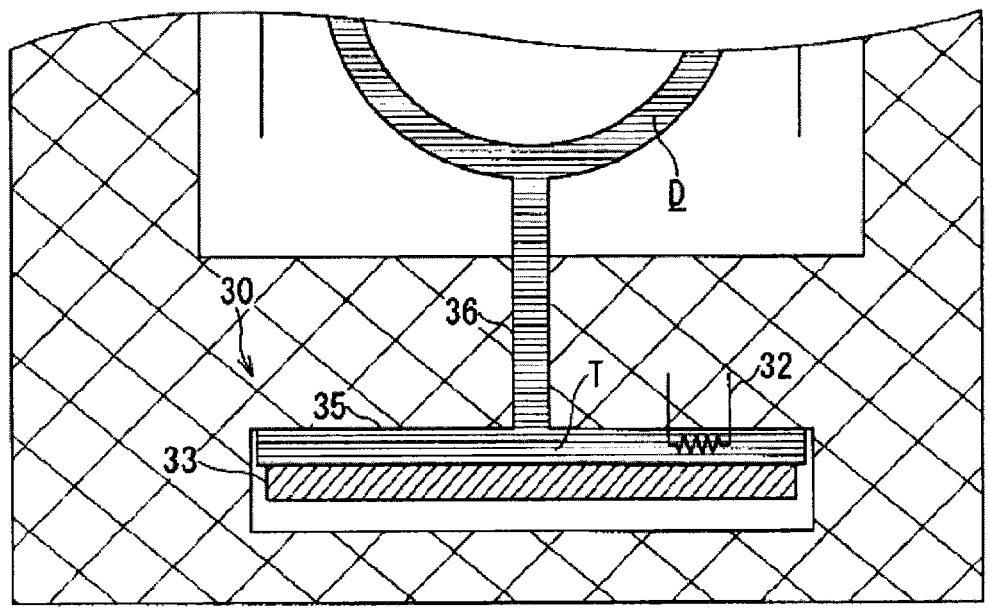
FIG. 5A is a sectional view partially showing a modification of the first embodiment.

FIG. 5A is a sectional view partially showing a modification of the first embodiment. The pressurization unit 33 includes a piston that vertically moves from the bottom end of the liquid reservoir unit 35 toward the opening direction of the connection path 36. The pressurization unit 33 pressurizes the filler T vertically to lead the filler T, which has been melted with the heater unit 32 in the liquid reservoir unit 35, to the gap D via the connection path 36. When the decay heat removal has been finished, the reverse action returns the piston of the pressurization unit 33 to its original downside position, thereby returning the filler T, which has been injected into the gap D, to the inside of the liquid reservoir unit 35.

Figure 5B:
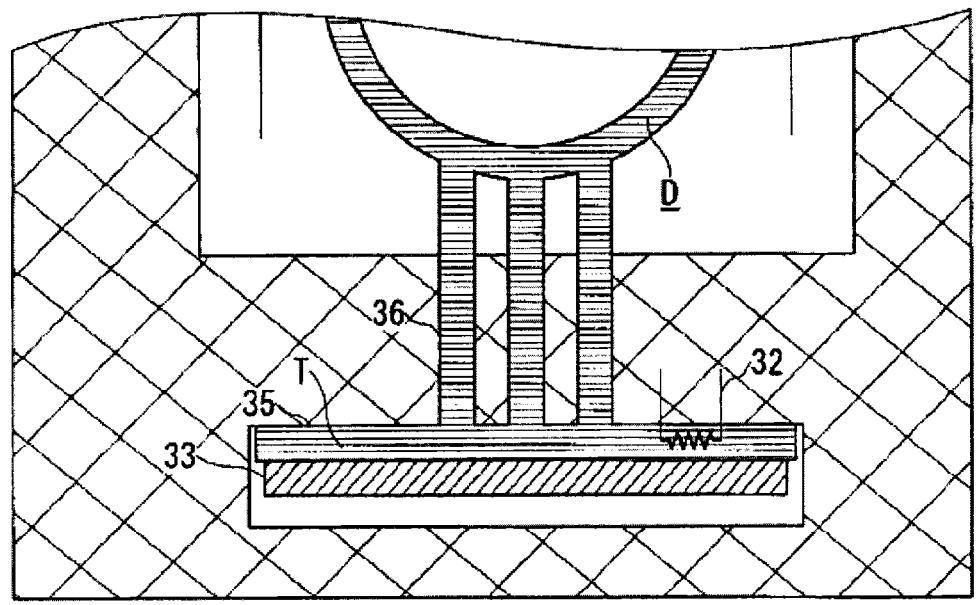
FIG. 5B is a sectional view partially showing another modification of the first embodiment.

FIG. 5B is a sectional view partially showing another modification of the first embodiment. In this modification, the connection path 36 includes two or more paths (3 paths shown). As a result, if the filler T, a low-melting-point metal, became hard and blocked any one of the paths, the other path can inject the filler T into the gap D.

Second Embodiment

Figure 6:
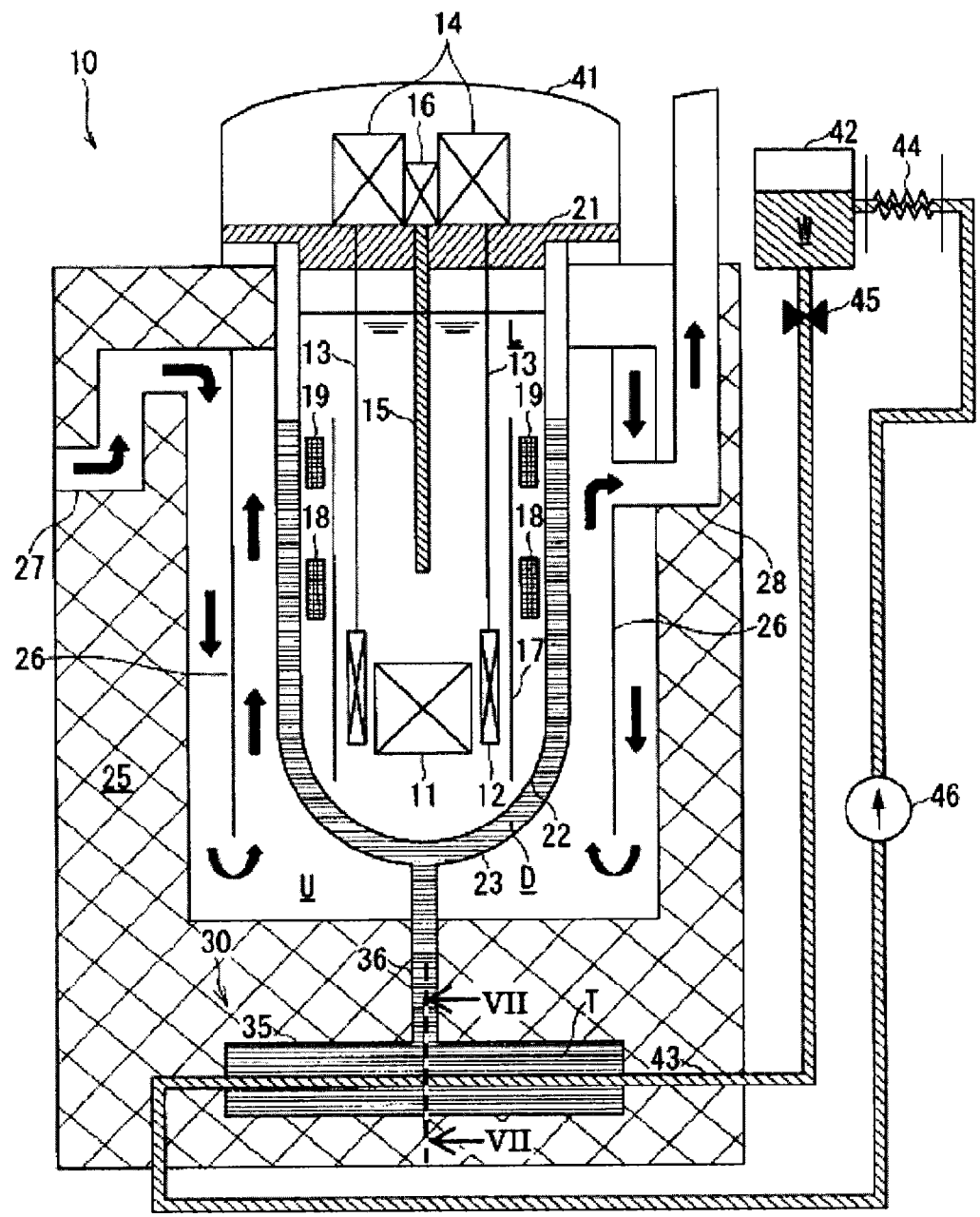
FIG. 6 is a structural section showing a liquid metal cooled nuclear reactor in accordance with a second embodiment.
Figure 7:
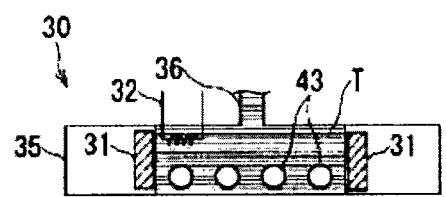
FIG. 7 is a sectional view cut along a VII-VII line in FIG. 6.

A second embodiment will be described below with reference to FIGS. 6 and 7. FIG. 7 shows a section cut along the line VII-VII in FIG. 6. Furthermore, the same portions in FIGS. 6 and 7 as those in FIG. 1 or the like will be denoted by the same numerals as those in FIG. 1, and a detailed description will be omitted by employing the previously described.

The reactor 10 in the second embodiment has an injection unit 30 where a circulating path 43 of a coolant W is formed for cooling down the filler T previously heated in the gap D. In addition, two or more circulating paths (4 paths shown) are formed in the liquid reservoir unit 35 as the circulating path 43, such that the circulating path 43 does not interfere with the action of the pressurization unit 31. Water, air or the like are employed for the coolant W. The coolant W is circulated by a pump 46 provided in the circulating path 43 to remove heat of the filler T.

The tank 42 to store the coolant W is located in the pathway of the circulating path 43 such that the coolant W is supplied to the liquid reservoir unit 35 via the action of a flow-stopping valve 45 arranged next to a tank 42, which removes heat of the filler T having been heated to high temperatures. Then the coolant W having been heated is cooled down by a heat radiator 44 that is also arranged in the pathway of the circulating path 43.

In the second embodiment, after the filler T has been injected into the gap D, transferred decay heat reaches the liquid reservoir unit 35 via a connection path 36. Then, the flow-stopping valve 45 is opened to supply the coolant W to the liquid reservoir unit 35 from the tank 42 while heating with the heater unit 32 is stopped. This enables the function of RVACS to further enhance the heat removal effect of decay heat.

Third Embodiment

Figure 8:
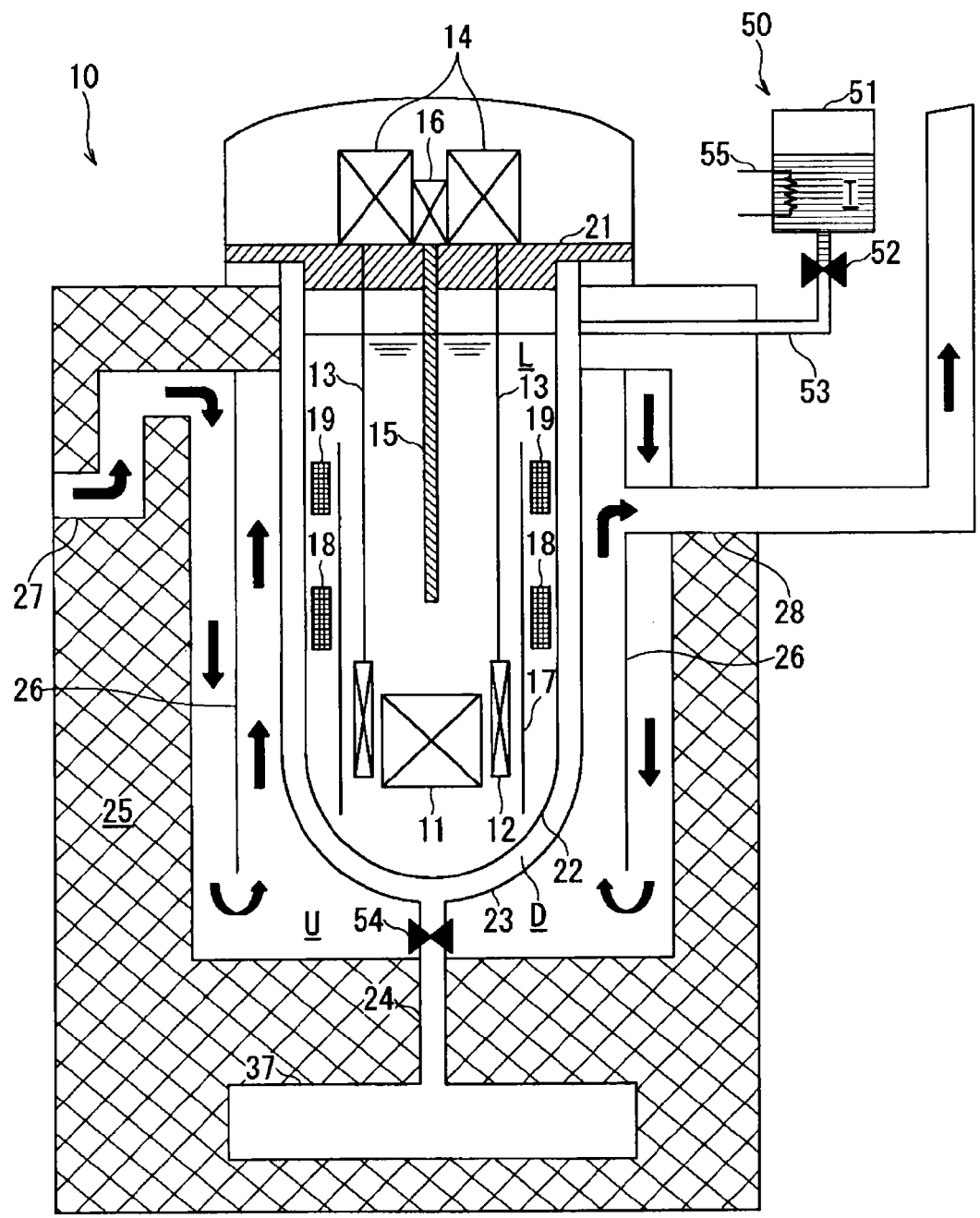
FIG. 8 is a structural section showing a liquid metal cooled nuclear reactor in accordance with a third embodiment.
Figure 9:
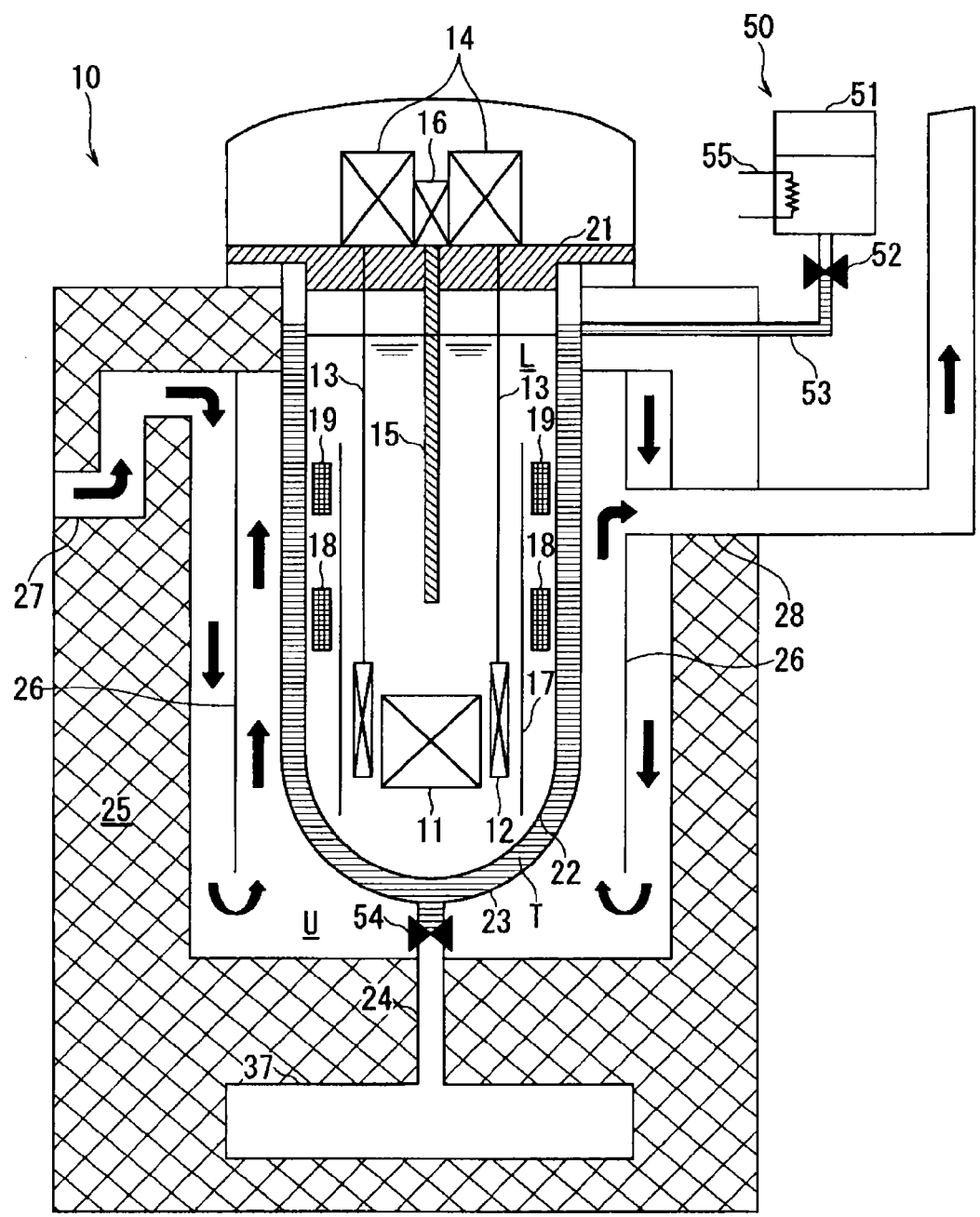
FIG. 9 is a view to explain operation of the liquid metal cooled nuclear reactor in accordance with the third embodiment.

A third embodiment will be described with reference to FIGS. 8, 9, and 10. Furthermore, the same portions in FIGS. 8, 9, and 10 as those in FIG. 1 or the like will be denoted by the same numerals as those in FIG. 1; and a detailed description will be omitted by employing the previously described. An injection unit 50 includes a liquid reservoir unit 51 to reserve the filler T at a position higher than the top of the coolant L, a connection path 53 to connect the liquid reservoir unit 51 to the gap D, a heater unit 55 to heat the filler T for keeping a melt state of the filler T, and a flow-stopping valve 52 for the filler T in the connection path 53. In the third embodiment, an end of the connection path 53 is connected to the containment 23.

Figure 10:
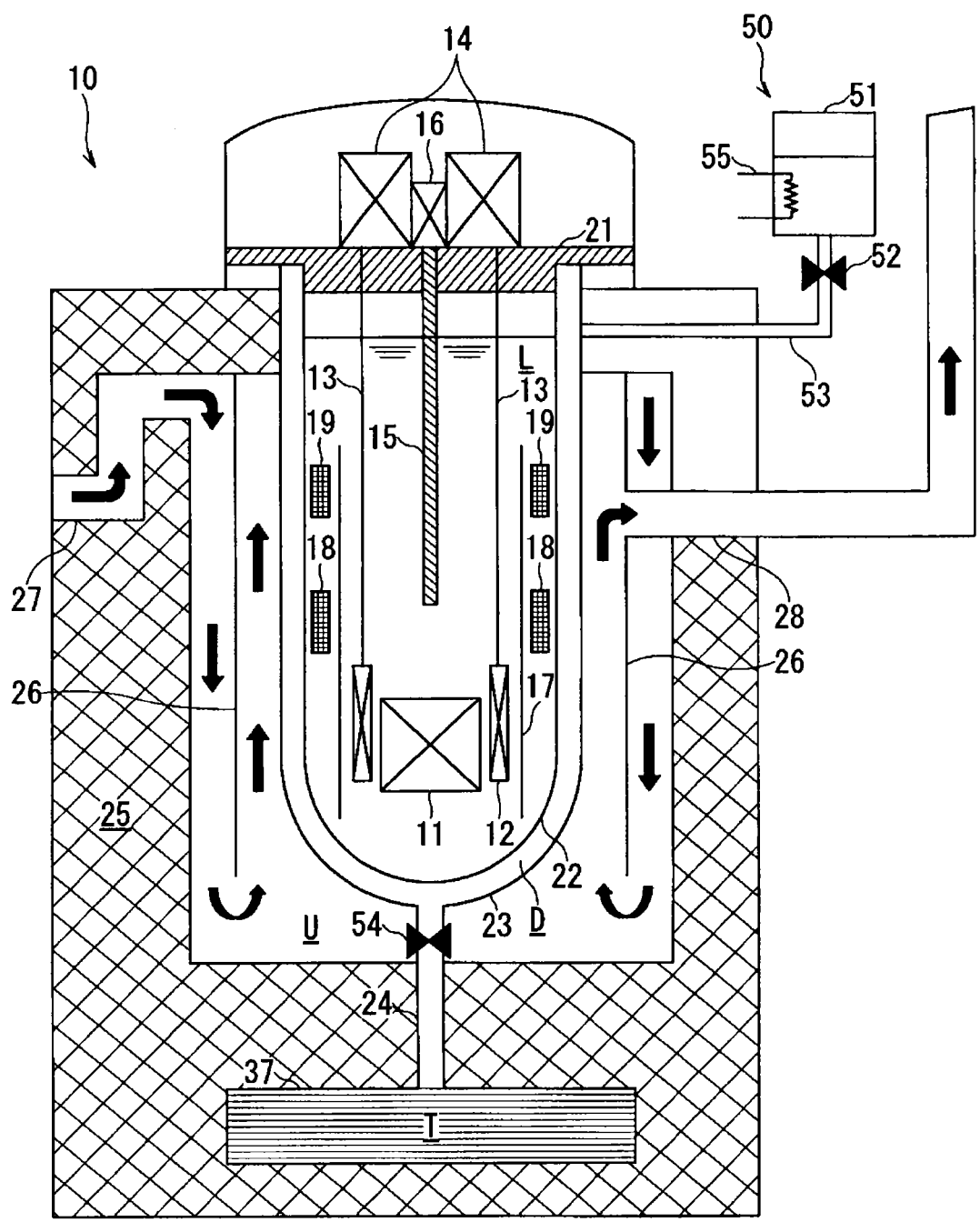
FIG. 10 is a view to explain operation of the liquid metal cooled nuclear reactor in accordance with the third embodiment.

Furthermore, in the position of the third embodiment corresponding to the injection unit 30 in the first and second embodiments (see FIG. 1), the drain unit 37 (see FIG. 9) is configured to drain the filler T at a lower position of the gap D than the bottom of the coolant L (see FIG. 10). A flow-stopping valve 54 for the filler T is provided in the pathway 24 connecting the gap D and the drain unit 37.

In the third embodiment, the injection unit 50 is held above the silo 25. The liquid reservoir unit 51 has capacity larger than the capacity of the gap D to reserve the filler T (see FIG. 8). When the flow-stopping valve 52 is opened, the filler T reserved in the liquid reservoir unit 51 falls with the force of gravity to be injected into the gap D via the connection path 53 (see FIG. 9). When the heat removal of decay heat has been finished, the flow-stopping valve 54 is opened to drain the filler T having been injected into the gap D to the drain unit 37 (see FIG. 10).

Fourth Embodiment

A fourth embodiment will be described with FIGS. 11, 12, and 13. Furthermore, the same portions in FIGS. 11, 12, and 13 as those in FIG. 8 or the like will be denoted by the same numerals as those in FIG. 8; and a detailed description will be omitted by employing the previously described. In the fourth embodiment, an end of a connection path 56 connecting a liquid reservoir unit 51 and the gap D is further connected to a pathway 24 connecting the gap D and a drain unit 37.

Figure 11:
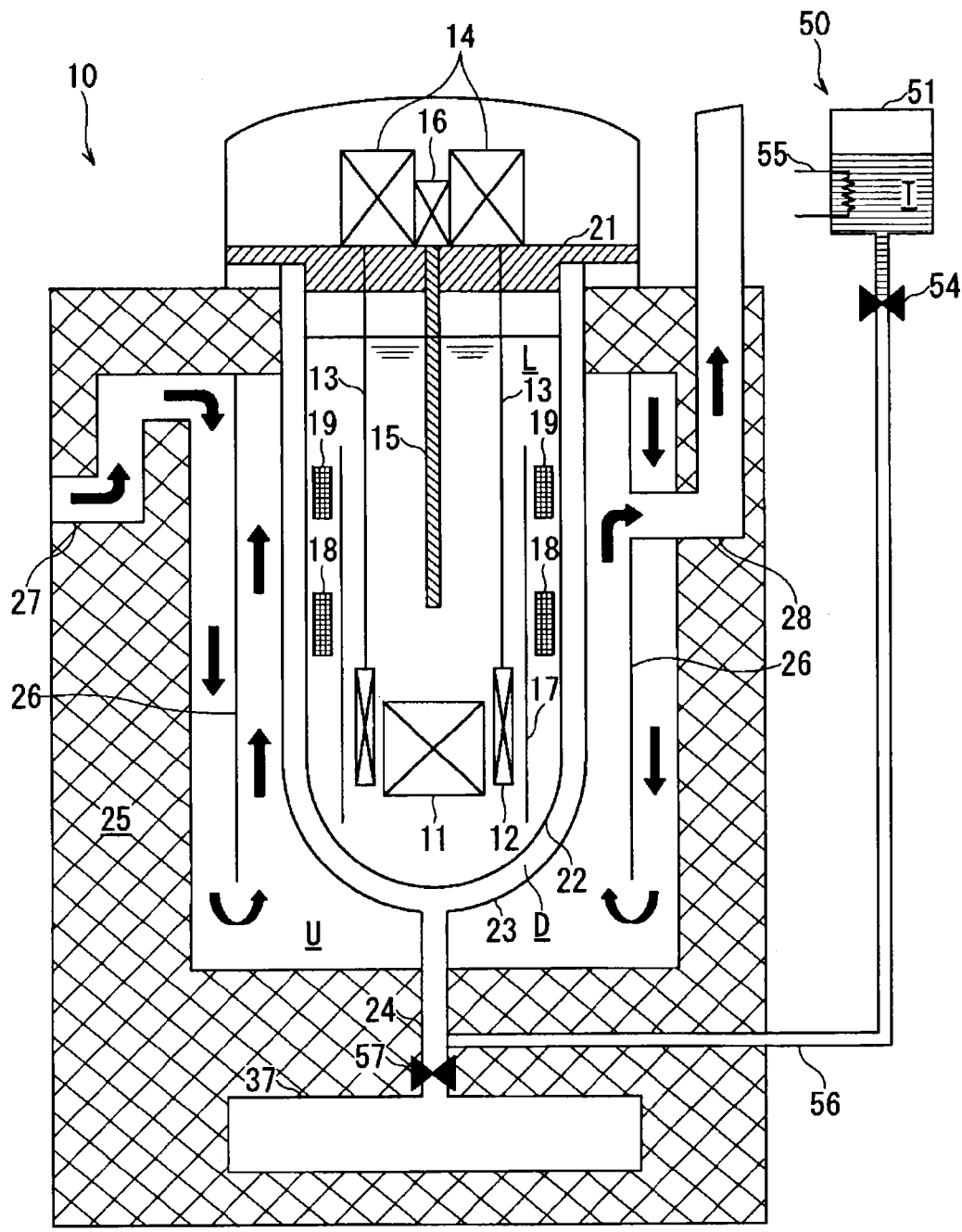
FIG. 11 is a structural section showing a liquid metal cooled nuclear reactor in accordance with a fourth embodiment.

In the fourth embodiment, the injection unit 50 is held above the silo 25, and the filler T is reserved in the liquid reservoir unit 51 having capacity larger than the capacity of the whole gap D (see FIG. 11). Opening the flow-stopping valve 54 causes the filler T reserved in the liquid reservoir unit 51 to fall with the force of gravity, which injects the filler T into the gap D via the connection path 56 (see FIG. 12). When the heat removal of decay heat has been finished, the flow-stopping valve 57 is opened to drain the filler T having been injected into the gap D to the drain unit 37 (see FIG. 13).

Fifth Embodiment

Figure 14:
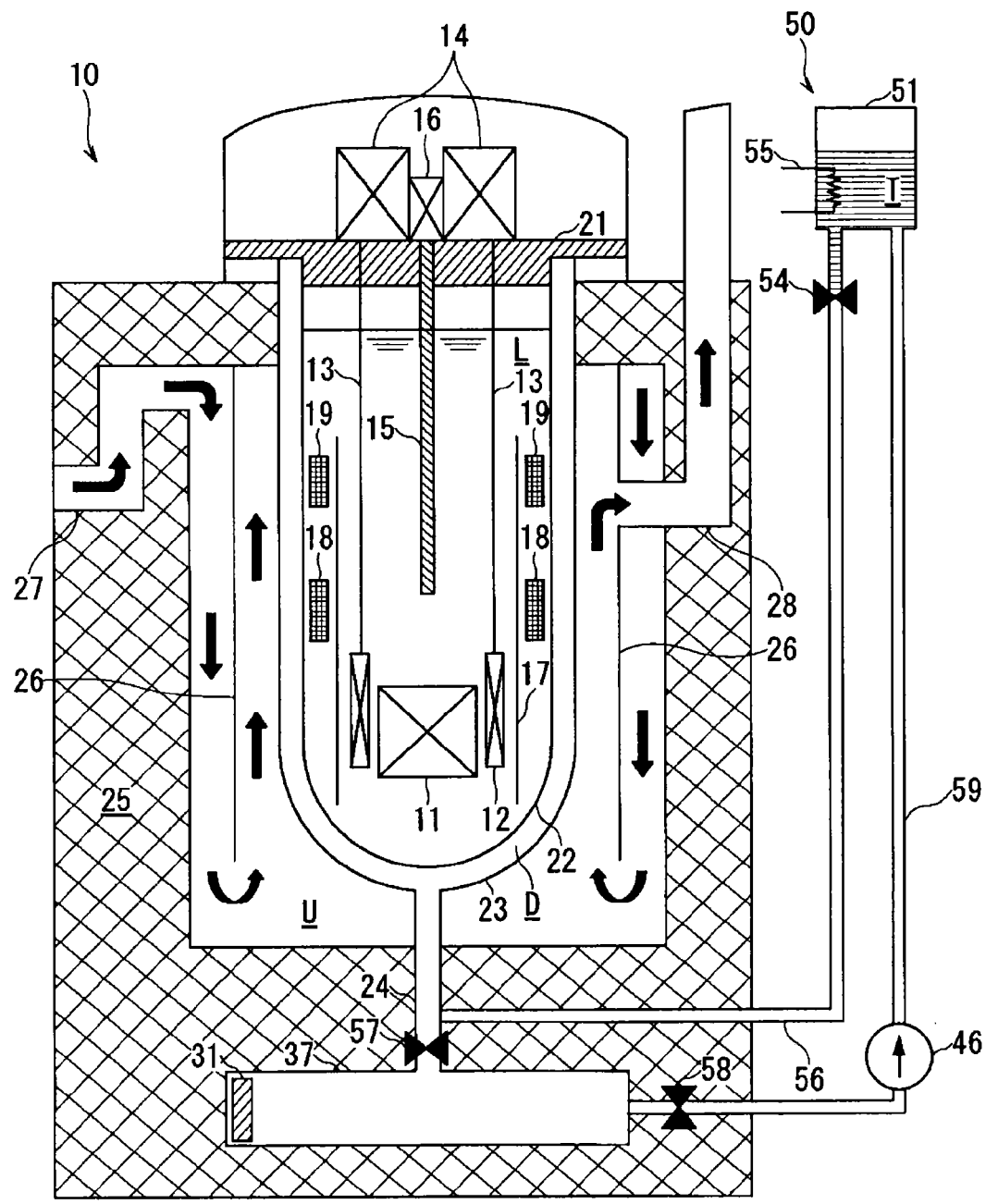
FIG. 14 is a structural section showing a liquid metal cooled nuclear reactor in accordance with a fifth embodiment.
Figure 15:
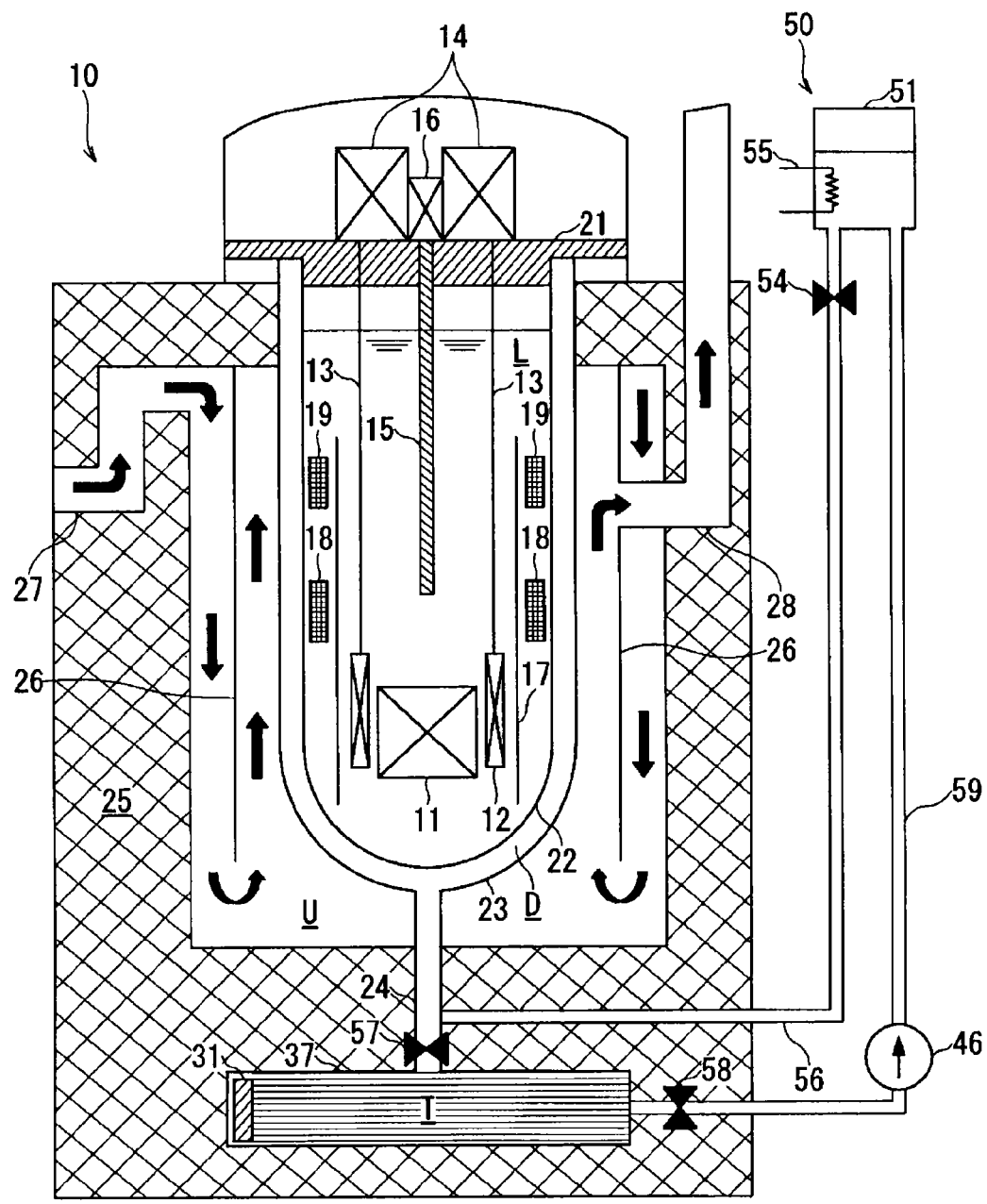
FIG. 15 is a view to explain operation of the liquid metal cooled nuclear reactor in accordance with the fifth embodiment.
Figure 16:
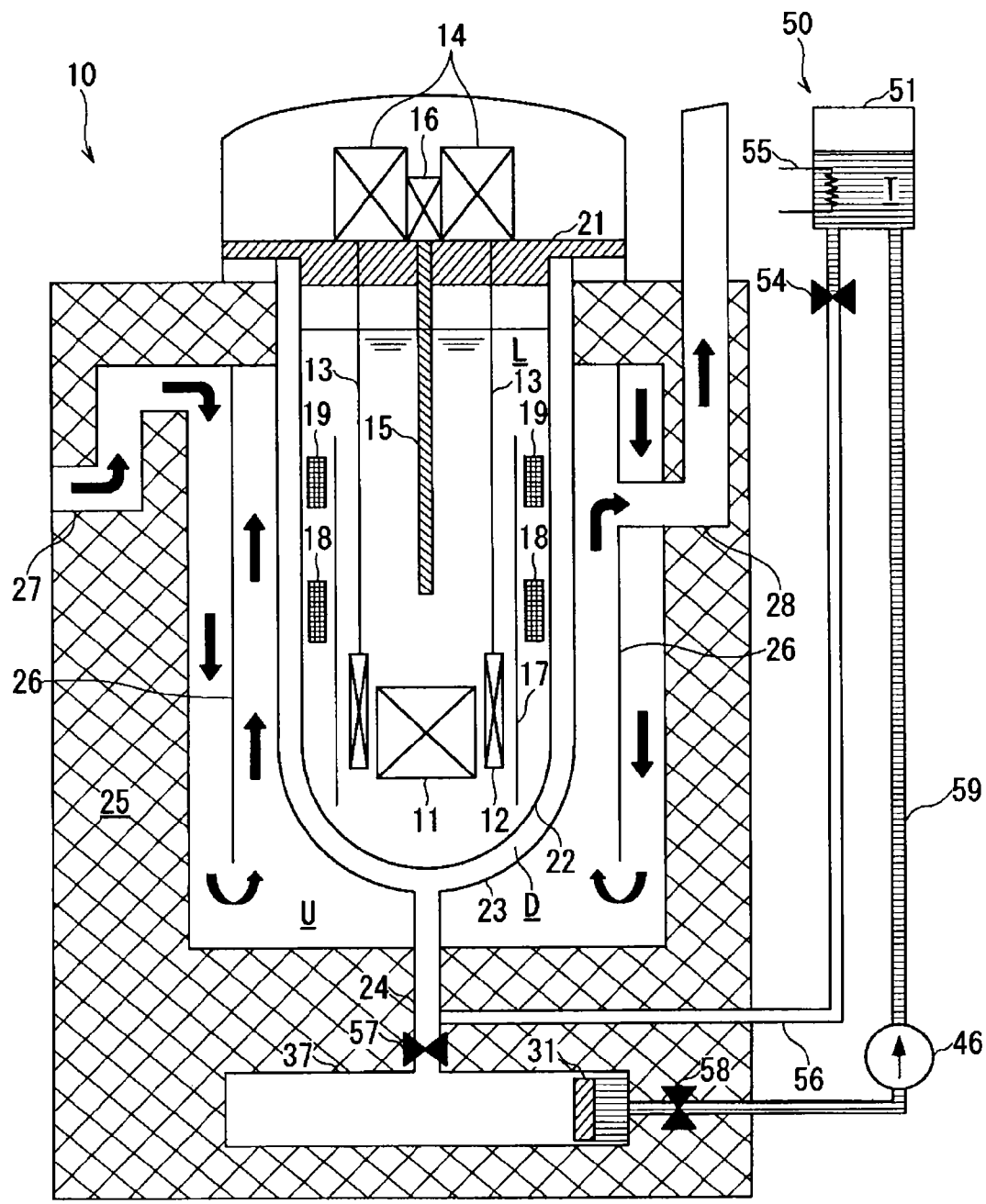
FIG. 16 is a view to explain operation of the liquid metal cooled nuclear reactor in accordance with the fifth embodiment.

A fifth embodiment will be described with reference to FIGS. 14, 15, and 16. Furthermore, the same portions in FIGS. 14, 15, and 16 as those in FIG. 11 or the like will be denoted by the same numerals as those in FIG. 11; and a detailed description will be omitted by employing the previously described. In the fifth embodiment, an injection unit 50 includes a return path 59 to return the filler T in a drain unit 37 to a liquid reservoir unit 51. Furthermore, a pressurization unit 31 pushes out the filler T having been drained into the drain unit 37 toward the return path 59.

Figure 12:
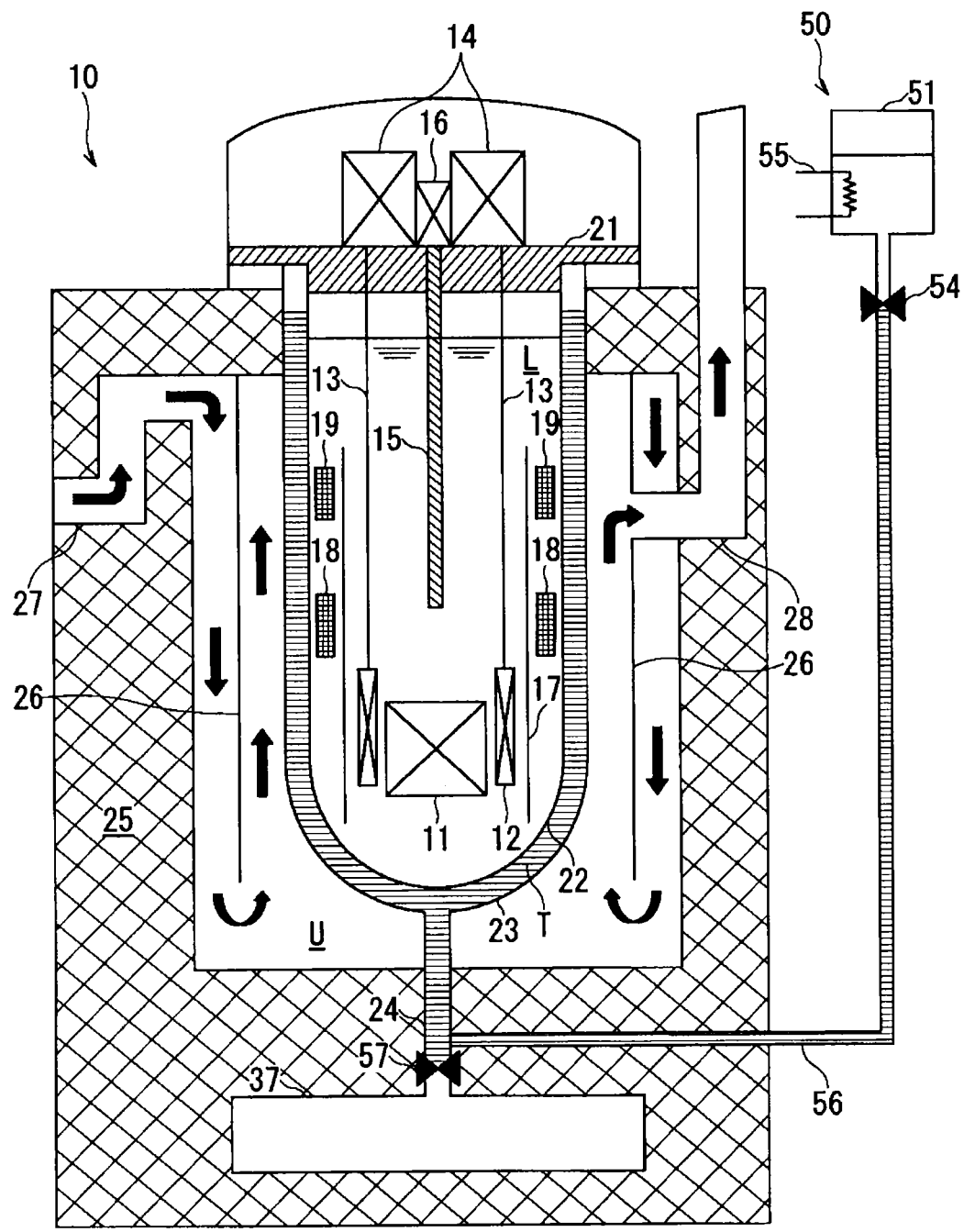
FIG. 12 is a view to explain operation of the liquid metal cooled nuclear reactor in accordance with the fourth embodiment.
Figure 13:
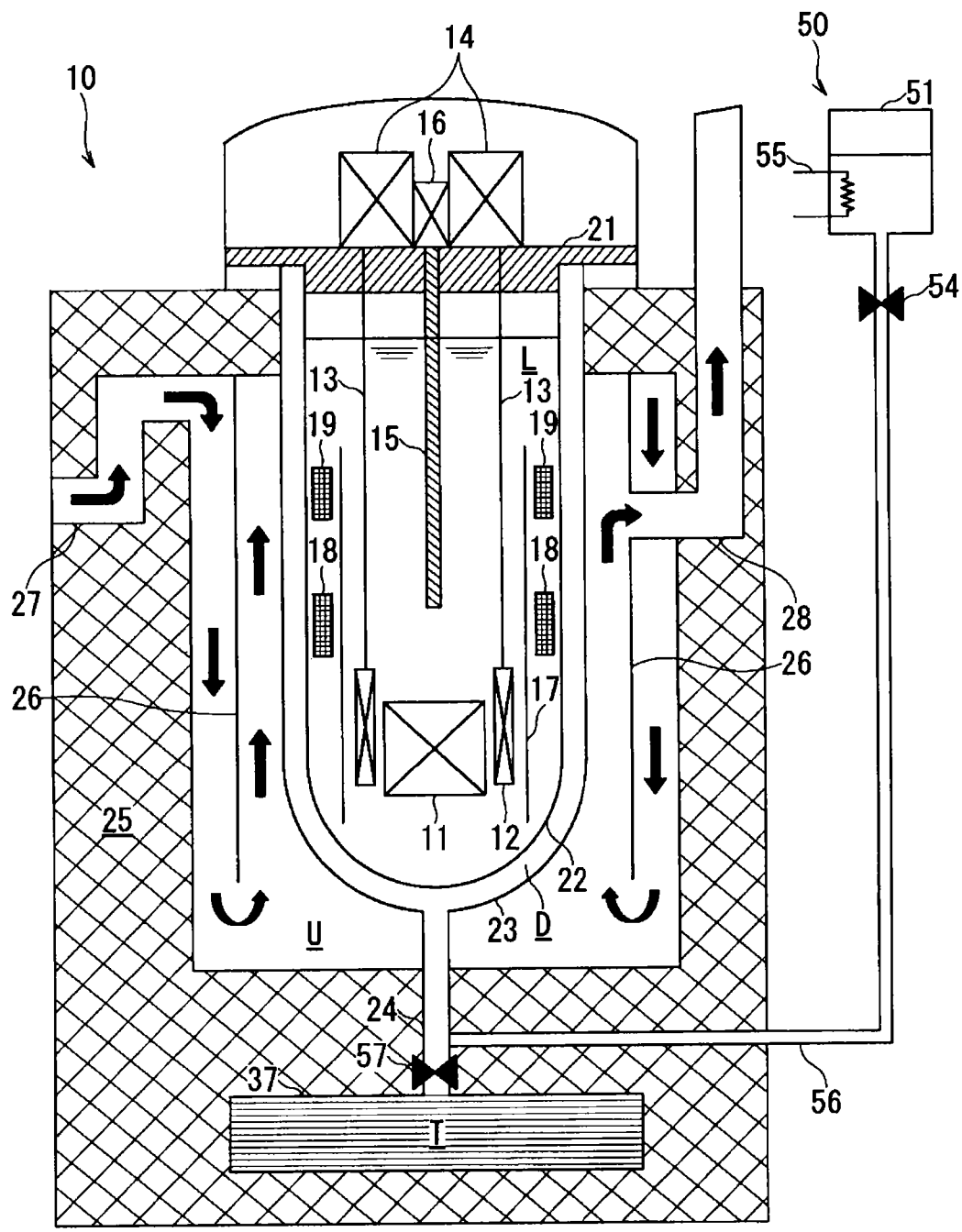
FIG. 13 is a view to explain operation of the liquid metal cooled nuclear reactor in accordance with the fourth embodiment.

In the fifth embodiment, the process to inject the filler T into the gap D is the same as that in the fourth embodiment shown in FIG. 12. After the decay heat removal, draining the filler T from the gap D into the drain unit 37 is the same as draining in the fourth embodiment shown in FIG. 13. When the filler T has been drained into the drain unit 37 (see FIG. 15), the flow-stopping valve 58 opens to cause the piston of the pressurization unit 31 to act, which pushes out the filler T toward the return path 59 (see FIG. 16). Then the filler T goes into the liquid reservoir unit 51 against the force of gravity owing to the pump 46 in the return path 59, thus being collected.

In accordance with the embodiments described above, the liquid metal cooled nuclear reactor has excellent capability of heat removal due to the filler T of a low-meting-point metal or the like to be injected into the gap D between the reactor vessel 22 and the containment 23.

While certain embodiments of the invention have been described, these embodiments have been presented by way of example only, and are not intended to limit the scope of the inventions. Indeed, the novel elements and apparatuses described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention. For example, the removal of decay heat has been exemplified employing the natural convection of air outside the containment, but is not limited to this, so that the heat removal may be performed by means of the forcible flow of air or by combining with other heat removal means.

What is claimed is:

1. A liquid metal cooled nuclear reactor comprising:
  a reactor vessel holding a reactor core and a coolant for the core;
  a containment surrounding an outside of the vessel;

an air flow path configured to flow air around the containment to remove heat from the containment; and an injection unit configured to inject a filler in a gap between the vessel and the containment, wherein the injection unit further comprises:

a liquid reservoir unit configured to reserve the filler;

a connection path connecting the liquid reservoir unit and the gap; and a heater unit configured to heat the filler in the reservoir to keep the filler in a melted state.

2. The reactor according to claim 1, wherein the injection unit further comprises:

a pressurization unit configured to pressurize the filler to lead the filler from the liquid reservoir unit to the gap, wherein the liquid reservoir unit is provided at a lower position than a bottom of the coolant.

3. The reactor according to claim 2, wherein the pressurization unit has a piston, the piston moving horizontally or vertically from ends of the liquid reservoir unit toward an opening direction of the connection path in the liquid reservoir unit.

4. The reactor according to claim 1, wherein the injection unit includes a circulating path to cool down the filler having been heated in the gap.

5. The reactor according to claim 1, wherein:

the injection unit further comprises a first flow-stopping valve for the filler arranged in the connection path; and the liquid reservoir unit is provided to reserve the filler at a higher position than a top of the coolant.

6. The reactor according to claim 5, further comprising:

a drain unit configured to drain the filler at a lower position of the gap than a bottom of the coolant.

7. The reactor according to claim 6, wherein the connection path connects to the gap via a pathway.

8. The reactor according to claim 6, further comprising a return path to return the filler in the drain unit to the liquid reservoir.

9. A heat removal method for a liquid metal cooled nuclear reactor including a reactor vessel holding a reactor core, a containment surrounding an outside of the reactor vessel, a liquid reservoir unit holding a filler, and a coolant for the reactor core, the method comprising:

reserving the filler in the liquid reservoir unit;

heating the filler in the liquid reservoir unit to keep a melted state;

injecting the filler from the liquid reservoir unit into a gap between the reactor vessel and the containment; and flowing air around the containment to remove heat from the containment.

* * * * *